United States Patent [19]

Das et al.

[11] Patent Number: 5,641,829

[45] Date of Patent: *Jun. 24, 1997

[54] COATING COMPOSITIONS PREPARED FROM BASE NEUTRALIZED, STABLE AQUEOUS DISPERSION OF HYDROXYL FUNCTIONAL ACRYLIC POLYMERS

[75] Inventors: Suryya K. Das, Allegheny County; Soner Kilic, Hampton Township, both of Pa.

[73] Assignee: PPG Industries, Inc., Pittsburgh, Pa.

[*] Notice: The term of this patent shall not extend beyond the expiration date of Pat. No. 5,464,897.

[21] Appl. No.: 472,049

[22] Filed: Jun. 6, 1995

Related U.S. Application Data

[60] Continuation-in-part of Ser. No. 236,832, May 2, 1994, abandoned, which is a division of Ser. No. 13,139, Feb. 3, 1993, Pat. No. 5,342,878, which is a continuation of Ser. No. 814,658, Dec. 30, 1991, abandoned.

[51] Int. Cl.⁶ ..................................... C08L 83/00
[52] U.S. Cl. .................. 524/507; 524/458; 524/460; 524/502; 524/512; 524/523; 524/558; 526/201
[58] Field of Search ....................... 524/460, 502, 524/507, 512, 558, 458, 523; 526/201

[56] References Cited

U.S. PATENT DOCUMENTS

| | | |
|---|---|---|
| 3,719,695 | 3/1973 | Eidt . |
| 4,064,087 | 12/1977 | Das . |
| 4,151,143 | 4/1979 | Blank et al. . |
| 4,276,432 | 6/1981 | Rhum et al. . |
| 4,345,057 | 8/1982 | Yamabe et al. . |
| 4,501,868 | 2/1985 | Bouboulis et al. . |
| 4,609,690 | 9/1986 | Gruber et al. . |
| 4,656,237 | 4/1987 | Weber, Jr. . |
| 4,687,822 | 8/1987 | Eguchi et al. . |
| 4,711,944 | 12/1987 | Sherwin et al. . |
| 4,758,642 | 7/1988 | Yezrielev et al. . |
| 4,777,230 | 10/1988 | Kamath . |
| 4,855,369 | 8/1989 | Yezrielev et al. . |
| 4,880,889 | 11/1989 | Jung et al. . |
| 4,978,708 | 12/1990 | Fowler et al. . |
| 4,985,517 | 1/1991 | Yezrielev et al. . |
| 5,011,881 | 4/1991 | Fujii et al. . |
| 5,037,913 | 8/1991 | Leussler et al. . |
| 5,055,514 | 10/1991 | Kumada et al. . |
| 5,057,312 | 10/1991 | Langla et al. . |
| 5,098,947 | 3/1992 | Metzger et al. ................. 524/504 |
| 5,204,404 | 4/1993 | Werner, Jr. et al. . |
| 5,281,655 | 1/1994 | Mitsuji et al. . |

FOREIGN PATENT DOCUMENTS

| | | |
|---|---|---|
| 099647 | 2/1984 | European Pat. Off. . |
| 103146 | 3/1984 | European Pat. Off. . |
| 103199 | 3/1984 | European Pat. Off. . |
| 158161 | 10/1985 | European Pat. Off. . |
| 197460 | 10/1986 | European Pat. Off. . |
| 206072 | 12/1986 | European Pat. Off. . |
| 275051 | 7/1988 | European Pat. Off. . |
| 320156 | 6/1989 | European Pat. Off. . |
| 341716 | 11/1989 | European Pat. Off. . |
| 2450785 | 5/1976 | Germany . |
| 7208621 | 3/1972 | Japan . |
| 55-106267 | 8/1980 | Japan . |
| 57-42706 | 3/1982 | Japan . |
| 57-162708 | 10/1982 | Japan . |
| 58-13662 | 1/1983 | Japan . |
| 59-1776 | 1/1984 | Japan . |
| 59-64614 | 4/1984 | Japan . |
| 61-247705 | 11/1986 | Japan . |
| 859297 | 1/1961 | United Kingdom . |
| 1145564 | 3/1969 | United Kingdom . |
| 1516368 | 7/1978 | United Kingdom . |
| 2169911 | 7/1986 | United Kingdom . |
| 2196973 | 5/1988 | United Kingdom . |
| 2201683 | 9/1988 | United Kingdom . |
| 90/00570 | 1/1990 | WIPO . |

*Primary Examiner*—Judy M. Reddick
*Attorney, Agent, or Firm*—Dennis G. Millman

[57] ABSTRACT

A waterborne coating composition contains a base neutralized, stable, aqueous dispersion of a hydroxyl functional acrylic polymer containing less than 1 percent acid, having a number average molecular weight ranging from about 500 to about 4500 and having an acid value of at least about 1.5 and no greater than about 10 is prepared from a vinyl monomer component containing at least about 50 percent 2-hydroxyethyl acrylate and at least one other comonomer. The proportion of each monomer is selected so that the resultant polymer forms stable dispersion in water without externally added surfactant. The coating composition also contains a crosslinking agent adapted to react with the hydroxyl groups of the acrylic polymer.

7 Claims, No Drawings

COATING COMPOSITIONS PREPARED FROM BASE NEUTRALIZED, STABLE AQUEOUS DISPERSION OF HYDROXYL FUNCTIONAL ACRYLIC POLYMERS

CROSS REFERENCE TO RELATED APPLICATIONS

This application is a continuation-in-part of U.S. patent application Ser. No. 08/236,832 filed May 2, 1994, now abandoned which was a divisional of U.S. patent application Ser. No. 08/013,139 filed Feb. 3, 1993 (now U.S. Pat. No. 5,342,878), which was a continuation of U.S. patent application Ser. No. 07/814,658 filed Dec. 30, 1991 (now abandoned). This application is also related in subject matter to U.S. patent application Ser. No. 08/280,027 filed Jul. 25, 1994, U.S. Pat. No. 5,464,897 which is a continuation in part of U.S. patent application Ser. No. 07/814,657 (now abandoned).

BACKGROUND OF THE INVENTION

The present invention relates to coating compositions that utilize acrylic polymers which can be dispersed or solubilized in water.

Generally speaking, there are two basic ways to synthesize a water reducible or dispersible polymer to be used for the preparation of aqueous coating compositions. In the first instance, a monomer mixture which contains some acid group containing monomer is polymerized such that the resultant polymer contains acid functionality. Acid functional acrylic polymers are an example of this type of material. Alternatively, one can condense mono-, di- or polybasic acids with polyols to form a polyester or alkyd resin in which residual acid functionality is present for the purposes of water dispersion or solubilization. These polymers are water soluble or dispersible when neutralized with an appropriate base such as an amine and an appropriate organic cosolvent. Coating compositions prepared from such polymers can be crosslinked with aminoplast type crosslinking agents which react primarily with the reactive hydroxyl and amide groups of the polymers. Therefore, after cure, the films which are formed from these water solubilized compositions typically contain unreacted carboxyl groups which were utilized in the water solubilization or dispersion process but which were not consumed during the curing process. Although, the art discloses systems where anionic carboxyl functional waterborne polymers have been cured with polyepoxides, polyaziridines or carbodiimides to consume the carboxyl functionality by which they are waterborne, these materials are relatively toxic and difficult to handle and necessitate two pack application for stability.

Another manner of preparing water reducible or water solubilized polymers for aqueous coating compositions is with the assistance of externally added surfactants which act as emulsifiers to facilitate the solubilization of the polymer into water even though water solubilizing groups are not necessarily present.

These two approaches to the preparation of water reducible or water solubilized materials share several advantages and disadvantages. The materials are advantageous because they permit the formulation of water based coating compositions which have typically a low volatile organic content and at the same time have a variety of good coating properties such as ease of application, good gloss and general appearance. The common disadvantage of the two approaches is the diminished water resistance of coating compositions formulated from the water dispersible polymer. In the first approach, water sensitivity is imparted to the coating from the residual unreacted acid groups which remain after cure of the coating composition. These groups adversely affect the coating's ability to withstand humid environments and also contribute to diminished corrosion resistance and adhesion of the coating. In the second instance, the surfactants which are utilized to assist in emulsification or solubilization of the polymer into water are themselves highly water soluble materials and hence contribute to the overall water sensitivity of coating films derived from such polymers. Once again, the presence of these materials in the film adversely affects the film's ability to withstand humid environments and also diminish the corrosion resistance properties of the film as well as the wet adhesion.

There is a need, therefore, for a waterborne polymer which is capable not only of being solubilized into water but also cured by curing agents such as aminoplast and blocked isocyanate crosslinking agents without the presence of acid functionality or externally added surfactants.

SUMMARY OF THE INVENTION

In accordance with the present invention there is provided a waterborne coating composition comprising (a) a base neutralized, stable, aqueous dispersion of a hydroxyl functional acrylic polymer containing less than 1 percent acid and having a number average molecular weight ranging from about 500 to about 4500 and having an acid value of about 1.5 and no greater than 10, synthesized from a vinyl monomer component comprising at least about 50 percent of 2-hydroxyethyl acrylate and at least one other comonomer, the proportion of each monomer and the acid value being adapted to provide a polymer which forms a stable dispersion in water without externally added surfactant; and (b) a crosslinking agent adapted to react with the hydroxyl groups of the acrylic polymer of (a). The acrylic polymer (a) may serve as a dispersant for the dispersion polymerization of another polymer which may provide desired properties to the cured coating.

The waterborne hydroxyl functional acrylic polymer of the present invention is cured by virtue of the same functionality which renders it waterborne, whereby affinity for water, and thus susceptibility to surface deterioration from humidity, in the cured film due to the presence of additional functionality is reduced.

DETAILED DESCRIPTION OF THE INVENTION

An important aspect of the present invention is the acid content of the hydroxyl functional acrylic polymer. The inventive hydroxyl functional acrylic polymer contains less than 1 percent acid. In addition, the hydroxyl functional acrylic polymer has an acid value no greater than 10, although it has been found expedient to provide an acid value of at least about 1.5. Acid values of less than about 1.5 are not preferred because dispersion of the polymer into water is difficult. Acid values greater than about 10 are not preferred because the polymer has a tendency to diminish water resistance of coating compositions prepared.

The acrylic polymer is synthesized from vinyl monomers, at least 50 percent by weight of which are 2-hydroxyethyl acrylate. The vinyl monomers also comprise at least one other vinyl comonomer. The proportion of the 2-hydroxyethyl acrylate and the other vinyl comonomer or comonomers can vary, with the provision that the proportion of each monomer utilized is adapted to provide a resultant hydroxyl functional acrylic polymer which is capable of forming a stable dispersion in water without externally added surfactant. Therefore, depending upon the choice of comonomer in the vinyl monomer component, the amount of 2-hydroxyethyl acrylate which is utilized may be substantially more than 50 percent so long as the resultant polymer exhibits the requisite dispersibility in water. The use of 2-hydroxyethyl acrylate is critical to achieve a hydroxyl functional acrylic polymer which has less than 1 percent acid. In the instance of significantly less than 50 percent of 2-hydroxyethyl acrylate, for example, 40 percent by weight, the resultant polymer is not dispersible in water.

By virtue of the manner of preparing commercially available 2-hydroxyethyl acrylate monomer, a small amount of residual acid content is present in the monomer. Although the objective of this invention is otherwise to minimize the acid content of the acrylic polymer, this small amount of residual acid in the 2-hydroxyethyl acrylate monomer is believed to facilitate solubilization of a polymer prepared from the monomer. Another source of acid groups in the present invention is believed to be contributed by some of the polymerization initiators that may be used in the synthesis of the acrylic polymers. No other deliberate incorporation of acid functional monomers is involved in making the acrylic polymer of the present invention. Additionally, the present invention avoids the use of externally added surfactants.

A commercially available 2-hydroxyethyl acrylate typically contains less than 1 percent acid, typically about 0.6 percent acid. A hydroxyl functional acrylic polymer prepared from about 50 percent of 2-hydroxyethyl acrylate and other comonomers results in a polymer containing less than 1 percent acid, typically less than 0.5 percent acid.

It is believed that the choice of free radical polymerization initiator used in the synthesis of the hydroxyl functional acrylic polymer can additionally influence the acid value of the polymer product formed. For example, acid functional azo initiator such as V-501 {4,4'-azobis(4-cyanopentanoic acid)} from Wako Pure Chemical Industries, Ltd., upon polymerization provides acid value to the polymer to aid in aqueous dispersibility. However, VAZO-67 {2,2'-azobis(2-methylbutanenitrile)} from E. I. dupont de Nemours & Company does not provide carboxy functionality and thereby does not contribute to the acid value of the polymer to aid in the aqueous dispersibility. It has been found that chain transferring peroxy initiators such as tertiary-butyl perbenzoate also provide acid value to aid in the aqueous dispersibility of the polymer. The mechanism of such reaction however, is not fully understood.

The acid value as well as the proportion of each monomer used in synthesis should be adapted to form a stable dispersion in water. When the proportion of 2-hydroxyethyl acrylate is about 50 percent, the acid value oft he resultant polymer should be at the higher end of the acid value range of from at least about 1.5 but not greater than 10. For proportions of 2-hydroxyethyl acrylate which are substantially higher than 50 percent, the acid value of the polymer can be at the lower end of the range.

The comonomer which is utilized in conjunction with the 2-hydroxyethyl acrylate can be selected from a wide variety of vinyl monomers. Examples of suitable vinyl monomers include n-butyl methacrylate, which is preferred, as well as methyl methacrylate and n-butyl acrylate. Many other vinyl monomers are known in the art and may be used as well. Preferably, the vinyl monomer mixture contains at least about 50 percent of 2-hydroxyethyl acrylate, as was mentioned above, and n-butyl methacrylate, the percentage being based on the total weight of the vinyl monomers. These percentages may vary depending upon the particular vinyl monomer and its ability to facilitate solubilization of the hydroxyl functional acrylic polymer into water in conjunction with the proportion of 2-hydroxyethyl acrylate which is selected.

The hydroxyl functional acrylic polymer generally has a number average molecular weight ranging from about 500 to 4500, preferably from about 2500 to about 4500 as determined by gel permeation chromatography using polystyrene as standard. The polymer is prepared by free radical initiated solution polymerization in the presence of a free radical initiator and an organic solvent which may be primarily non polar such as xylene, isopropyl benzene, high boiling ketones such as isobutyl ketone, and high boiling esters such as hexyl acetate. In embodiments in which the amounts of 2-hydroxyethyl acrylate are substantially above 50 percent, a polar solvent such as isopropanol is preferred to facilitate stable dispersion of the resultant hydroxyl functional acrylic polymer in water. For example, in an embodiment which utilizes 60 percent or more of 2-hydroxyethyl acrylate, use of isopropanol during the polymerization of the acrylic polymer facilitates the subsequent dispersion into water because the polymer is soluble in isopropanol. As one skilled in the art of polymer chemistry appreciates, the solvent used during synthesis should be one in which the resultant polymer is soluble, otherwise phase separation and precipitation of the polymer will likely occur. Even when a preferred amount of 2-hydroxyethyl acrylate is utilized, some solvents such as aromatic petroleum distillates like AROMATIC 100 solvent (an aromatic hydrocarbon blend from Exxon) have higher reflux temperatures, which higher temperatures can lead to a condensation reaction between acid and hydroxyl groups of the polymer, resulting in a crosslinked matrix sufficient to retard the polymer's dispersibility in water. The polymerization is generally carded out at a temperature of from about 60° C. to about 200° C., preferably from about 80° C. to 150° C. The polymer is prepared by solution polymerization in the organic solvent, followed by neutralization, the addition of water, and removal of the organic solvent by azeotropic distillation.

The hydroxyl functional acrylic polymer of the present invention is capable of forming a stable dispersion in water after neutralization of the minor amount of residual acid with a minor amount of basic material such as an amine. The amount of base required is typically much less than is normally required for neutralization of polymeric materials which contain acid functionality from the incorporation of acid functional monomers. This quality provides further advantages, particularly when the claimed hydroxyl functional acrylic polymers are utilized as dispersants in the free radical polymerization of fluoroolefins. Fluoroolefins readily undergo dehydrohalogenation and discoloration under aqueous basic environments. Therefore, the utilization of a dispersant in the polymerization process which contains minimal residual base avoids this difficulty and leads to a resultant aqueous a fluoropolymer dispersion which exhibits minimal to no dehydrohalogenation and discoloration. This is the subject of related, commonly assigned U.S. patent application Ser. No. 08/280,027 filed Jul. 25, 1994 now U.S. Pat. No. 5,464,897, which is a continuation in part of U.S. patent application Ser. No. 07/814,657 (now abandoned).

The amount of neutralizing base which is utilized to facilitate solubilization of the hydroxyl functional acrylic polymer into water generally varies from about 0.5 percent to about 10 percent, preferably from about 1 to about 5 percent, based on solids weight of the acrylic polymer. Examples of suitable neutralizing bases include dimethylethanolamine, N,N-ethyl-morpholine, triethylamine and ammonia.

The claimed hydroxyl functional acrylic polymer of the present invention is especially advantageous in the formulation of waterborne coating compositions which are capable of crosslinking with known curing agents to form a cured film. The coating compositions have good properties and are less susceptible to humidity and water. Of further significance, the claimed hydroxyl functional acrylic polymer is useful as a surfactant in the preparation of dispersion polymers by dispersion polymerization of a dispersed monomer phase in the presence of a continuous phase. Here again, the dispersant polymer is capable of participating in the polymerization and becoming an integral part of a cured film without contributing to humidity and water sensitivity.

Curing agents suitable for use with coating compositions incorporating the aqueous, hydroxyl functional polymers of the present invention are those reactive with the hydroxyl functionality. These are well-known in the coating art, and include commercially available aminoplasts and polyisocyanates. Particularly useful aminoplasts are the well known alkoxy derivatives of melamine.

The following examples are illustrative of the invention and are not intended to be limiting.

EXAMPLE 1—DISPERSANT

The following initial charge and feeds were used in the preparation of an acrylic polymer of the invention by solution polymerization technique.

| Ingredients | Parts by Weight |
| --- | --- |
| Initial Charge | |
| Xylene | 75.4 |
| Feed A | |
| tert-butyl perbenzoate | 19.6 |
| Xylene | 23.5 |
| Feed B | |
| 2-Hydroxyethyl acrylate | 195.9 |
| n-Butyl methacrylate | 195.9 |
| Feed C | |
| Xylene | 2.0 |
| Feed D | |
| Xylene | 2.0 |

The initial charge was heated in a reaction vessel with agitation to reflux temperature (141°–143° C.). Feeds A and B were initiated simultaneously and continued in a substantially continuous manner over a period of 3 hours while maintaining the reaction mixture at reflux temperature. At the completion of Feeds A and B, the addition funnels were rinsed with Feeds C and D, and the reaction mixture was held for 2 hours at 141 ° C. to complete the polymerization. The reaction mixture was cooled and filtered through 25 micron filter bag. The resultant acrylic polymer had a total solids content of 80.2 percent determined at 110° .C. for one hour and number average molecular weight of 3557 as determined by gel permeation chromatography (GPC) using polystyrene as standard. The polymer had an acid value of about 9.

The acrylic polymer prepared in xylene by solution polymerization technique was dispersed into aqueous medium as follows:

| Ingredients | Parts by Weight |
| --- | --- |
| Initial Charge | |
| Acrylic resin in xylene | 200.6 |
| Feed A | |
| Deionized water | 426.4 |
| N,N-dimethylethanolamine | 8.0 |
| Feed B | |
| Deionized water | 10.0 |

The initial charge was heated to a temperature of 82° C. with agitation in a reaction vessel suitable for azeotropic distillation under atmospheric pressure. Feed A was added to the reaction vessel over 1 hour period while maintaining the temperature of the mixture at 82°–84° C. At the completion of the addition of Feed A, the addition funnel was rinsed with Feed B and the reaction mixture was heated to azeotropic distillation temperature. After azeotropic distillation of xylene the product was cooled and filtered to yield an aqueous dispersion with a resin content of 26.1 percent, pH of 9.2, xylene content of 0.1 percent and particle size 613 Angstrom.

The following examples show the preparation of crosslinked and non-crosslinked aqueous dispersions using the aqueous dispersant of Example 1.

EXAMPLE 2—DISPERSION POLYMERIZATION

The following initial charge and feeds were used in the preparation of a non-crosslinked aqueous dispersion in the presence of aqueous dispersant of Example 1.

| Ingredients | Parts by Weight |
| --- | --- |
| Initial Charge | |
| Aqueous dispersant of Example 1 | 288.0 |
| Deionized water | 238.7 |
| Feed A | |
| n-Butyl methacrylate | 28.3 |
| n-Butyl acrylate | 18.8 |
| Methyl methacrylate | 4.3 |
| Hydroxypropyl methacrylate | 24.0 |
| VAZO-67[1] | 1.1 |

[1] 2,2'-Azobis(2-Methylbutanenitrile), available from E. I. du Pont de Nemours & Company.

The initial charge was heated to 85° C. with agitation in a reaction vessel suitable for aqueous dispersion polymerization. Feed A was added in a substantially continuous manner over a period of 2 hours while maintaining the reaction temperature at 84°–85° C. At the completion of Feed A the reaction mixture was held for 2 hours at 84°–85° C. to complete the polymerization. Finally, the reaction mixture was allowed to cool to room temperature. The resultant aqueous dispersion had a total solids of 23.3 percent determined at 110° C. for one hour and pH of 7.0.

EXAMPLE 3—DISPERSION POLYMERIZATION

The following example shows the preparation of a crosslinked dispersion by aqueous dispersion polymerization technique using the polymer of Example 1 as a dispersant. The following initial charge and feeds were used in the polymerization.

| Ingredients | Parts by Weight |
|---|---|
| Initial Charge | |
| Aqueous dispersant of Example 1 | 438.9 |
| Deionized water | 300.0 |
| Feed A | |
| n-Butyl acrylate | 7.8 |
| Methyl methacrylate | 7.2 |
| VAZO-67 | 0.4 |
| Feed B | |
| n-butyl acrylate | 49.0 |
| Methyl methacrylate | 49.0 |
| Divinylbenzene[1] | 2.0 |
| VAZO-67 | 2.5 |

[1]A mixture of meta plus para divinylbenzene (55.5%) and meta plus para ethylvinylbenzene (42.0%), available from Dow Chemicals.

The initial charge was heated to 87° C. with agitation in a reaction vessel suitable for aqueous dispersion polymerization. Feed A was added and the temperature of the reaction was held at 86°–87° C. for 1 hour. Feed B was added in a substantially continuous manner over a period of 3 hours while maintaining the reaction temperature at 85°–86° C. At the completion of Feed B the reaction mixture was held for 2 hours at 86° C. to complete the polymerization. Finally, the reaction mixture was allowed to cool to room temperature. The resultant aqueous dispersion had a total solids of 26.8 percent determined at 110° C. for one hour and pH of 7.1.

EXAMPLE 4—COATING COMPOSITION

The automotive silver color base coating composition which is available from PPG Industries, Inc. as UBCN HF33600E was spray applied to attain a dry film thickness of 0.44 mils. The applied wet film was flash baked at 250° F. for 5 minutes. The clear coating composition prepared from the following ingredients was spray applied over the silver base coat to attain a dry film thickness of 1.0 mil and baked at 180° F. for 5 minutes and then at 250° F. for 30 minutes.

| Ingredients | Parts by Weight | Solids |
|---|---|---|
| Acrylic resin according to Example 1 | 243.0 | 65.0 |
| CYMEL 327[1] | 39.8 | 35.0 |
| Catalyst[2] | 1.5 | 0.6 |
| Deionized water | 25.0 | — |

[1]Partially methylated melamine formaldehyde condensate with imino content in isobutanol available from CYTEC Industries.
[2]Mixture of phenyl dihydrogen phosphate and diphenyl monohydrogen phosphate in butanol available from Albright and Wilson Inc. Neutralized with N,N-dimethylethanolamine.

The resultant formulated coating composition was reduced to a No. 4 Ford cup viscosity of 25.1 seconds with 25 grams of deionized water and 6 grams of 2-butoxyethanol.

The films were then evaluated for appearance, resistance to xylene and humidity. No blushing or blistering was observed on the coated panel after 5 days at 110° F. humidity test. Gloss was measured with a 20 degree gloss meter manufactured by Hunter Lab. Distinctness of Image (DOI) was determined on a C-Box manufactured by C-Box I²R Co.

Crosshatch adhesion was determined in accordance with the procedures of ASTM 3359. The adhesion was rated on a scale of 0–5, with 5 indicating excellent adhesion. Xylene resistance was determined by placing two drops of xylene on the panel for 3 minutes. The pencil hardness of the spot in contact with the xylene was then determined. How much the coating softens compared to the original pencil hardness is a measure of the xylene resistance. Pencil hardness was determined by taking series of pencils having standard hardness variation, with hardness increasing with increasing number in the H series, and hardness decreasing with increasing number in the B series, with HB and F being of medium hardness between the H series and the B series. The test was conducted by scratching the panels with pencils of increasing hardness until the coating was etched away. Humidity resistance was determined by using the coated panel as the ceiling of a humidity chamber (QCT chamber) with the coating directed inwardly towards the chamber. The chamber was heated to 110° F. with about a 2-inch level of water located 3 to 5 inches below the coated panel (panel sloped). After being exposed for 5 days, the appearance, gloss, DOI and adhesion of the exposed coating were determined and compared with the original appearance, gloss, DOI and adhesion prior to humidity exposure. These results are reported in the following tables:

| 20° Gloss | DOI | Adhesion | Xylene Resistance |
|---|---|---|---|
| 83 | 85 | 5 | H |
| | Humidity Resistance: | | |
| 91 | 90 | 4 | |

The following Examples A through I demonstrate the unexpected ability of the dispersant polymers of the present invention to attain aqueous dispersion at low acid levels (i.e., acid value 1.5 to 10) when the polymer contains at least about percent by weight of 2-hydroxyethyl acrylate.

EXAMPLE A

This Example illustrates the preparation of a base neutralized aqueous dispersion of a hydroxyl functional acrylic polymer prepared from 40 percent by weight of 2-hydroxyethyl acrylate and 60 percent n-butyl methacrylate, the percentages based on resin solids, at about 80 percent total solids.

| Ingredients | Parts by Weight |
|---|---|
| Initial Charge | |
| Xylene | 105.0 |
| Feed A | |
| Tertiary-butyl perbenzoate | 20.0 |
| 2-Hydroxyethyl acrylate | 160.0 |
| n-Butyl methacrylate | 240.0 |

The initial charge was heated in a reaction vessel with agitation to reflux temperature. Feed A was added continuously over a 3 hour period while maintaining the reaction mixture at reflux temperature. At the completion of Feed A, the reaction mixture was held at about 140° C. to complete the polymerization. The reaction mixture was cooled to room temperature. The resultant acrylic polymer had a total solids of 83.4 percent determined at 110° C. for one hour and number average molecular weight of 2361 as determined by gel permeation chromatography (GPC) using polystyrene as standard. The acid value of the polymer was 6.9.

The acrylic polymer prepared in xylene by solution polymerization technique was dispersed in aqueous medium as follows:

| Ingredients | Parts by Weight |
| --- | --- |
| Initial Charge | |
| Acrylic resin in xylene | 525.0 |
| Feed A | |
| Deionized Water | 1200.0 |
| N,N-dimethylethanolamine | 0.7 |

The initial charge was heated to a temperature of about 60° C. with agitation in a reaction vessel suitable for azeotropic distillation under atmospheric pressure. Feed A was added to the reaction vessel over a 15 minute period and then the mixture heated to azeotropic distillation temperature. While the xylene was being removed by distillation, the dispersion started to separate. An additional 2.0 grams of N,N-dimethylethanolamine were added to aid redispersion, however, when the distillation of xylene was essentially complete, the dispersion was not stable.

Example A was also repeated in xylene with the exception of increasing the amount of N,N-dimethylethanolamine to 5 percent. The dispersion still was not stable. This shows that a stable, aqueous dispersion could not be prepared with only 40 percent by weight of 2-hydroxyethyl acrylate, regardless of the amount of base used in neutralization.

EXAMPLE B

This example illustrates the preparation of a base neutralized aqueous dispersion of a hydroxyl functional acrylic polymer prepared from 40 percent by weight of 2-hydroxyethyl acrylate and 60 percent n-butyl methacrylate, in isopropanol rather than xylene using VAZO-67 as initiator instead of tertiary-butyl perbenzoate and with 5 percent N,N-dimethylethanolamine.

With the exception of the above changes, this Example is a repeat of Example A, above.

Upon distillation of the product to remove isopropanol, the dispersion phase separated. This dispersion was not stable. Examples A and B show that a stable, aqueous dispersion could not be prepared with only 40 percent by weight of 2-hydroxyethyl acrylate, regardless of the solvent or amount of base used in neutralization.

EXAMPLE C

This example illustrates the preparation of a base neutralized aqueous dispersion of a hydroxyl functional acrylic polymer prepared from 60 percent by weight of 2-hydroxyethyl acrylate and 40 percent by weight of n-butyl methacrylate in xylene, the percentages based on resin solids, at about 80 percent total solids.

| Ingredients | Parts by Weight |
| --- | --- |
| Initial Charge | |
| Xylene | 630.0 |

| Ingredients | Parts by Weight |
| --- | --- |
| Feed A | |
| Tertiary-butyl perbenzoate | 120.0 |
| 2-Hydroxyethyl acrylate | 1440.0 |
| n-Butyl methacrylate | 960.0 |

The initial charge was heated in a reaction vessel with agitation to reflux temperature. Feed A was added continuously over a 4 hour period while maintaining the reaction mixture at reflux temperature. During the course of addition, the reaction mixture appeared translucent and was very viscous. To reduce viscosity, 400 grams of xylene were added in two 200 gram portions, about 1 hour apart. At the completion of the addition, the reaction mixture was held at about 140° C. for 3 hours to complete the polymerization and then cooled. The resultant polymer had a translucent appearance and appeared to have a gel-like structure. The batch was filtered through a coarse paint filter after heating to 95° C. The acid value of the polymer was 10.0.

An 800 gram batch of this reaction product was mixed with 28.4 grams of N,N-dimethylethanolamine and 1703.7 grams of deionized water and azeotropic distillation was conducted as described above in Example A to remove solvent. The resultant product was foamy and viscous and settlement was observed upon standing. The dispersion was not stable. The results of this example appear to be anomalous to the principles of the present invention, since a stable dispersion was not formed at 60 percent of 2-hydroxyethyl acrylate. However, it is believed that this was due to the fact that the hydroxy functional acrylic polymer was not optimally soluble in xylene as formed and thus phase separated upon preparation. The polymer was found to be optimally soluble in a more polar solvent such as isopropanol (see Examples E and G).

EXAMPLE D

This example was a repeat of Example C at a lower total solids level of 60 percent. The resultant polymer separated upon standing and was unacceptable. This result appeared to be anomalous for the same reason as Example C.

EXAMPLE E

This example illustrates a preferred embodiment of the present invention, a base neutralized, aqueous dispersion of a hydroxyl functional acrylic polymer prepared from 70 percent by weight 2-hydroxyethyl acrylate and 30 percent by weight of n-butyl methacrylate in isopropanol using VAZO-67 as initiator.

| Ingredients | Parts by Weight |
| --- | --- |
| Initial Charge | |
| Isopropanol | 698.2 |
| Feed A | |
| VAZO-67 | 99.7 |
| 2-Hydroxyethyl acrylate | 1396.4 |
| n-Butyl methacrylate | 598.5 |
| Isopropanol | 698.2 |

| Ingredients | Parts by Weight |
| --- | --- |
| Feed B | |
| Feed A (5 percent) | 139.6 |

The initial charge was heated in a reaction vessel with agitation to reflux temperature (about 80° C.). Feed B was then added and the reaction mixture held for 30 minutes. While the reaction mixture was refluxing, Feed A was added over a 3 hour period. When the addition was complete, the reaction mixture was held for 3 hours at about 87° C. The resultant acrylic polymer had a number average molecular weight of 2518 as determined by gel permeation chromatography (GPC) using polystyrene as standard.

A 1441.5 gram batch of this reaction product was mixed with 43.8 grams of N,N-dimethylethanolamine and 2014.7 grams of deionized water to disperse the polymer. The resultant dispersion was heated slowly to reflux and azeotropic distillation was conducted to remove solvent. During the procedure, an additional 308.0 grams of deionized water was added and azeotropic distillation continued until the first to occur of either: the total solids was between 30 and 40 percent or the viscosity became too high. The total solids upon completion of the distillation was 39.25 percent.

EXAMPLE F

To demonstrate the importance of base neutralization with amine to achieve good dispersion, an attempt was made to disperse the polymer of Example E in water without amine neutralization. This was unsuccessful.

EXAMPLE G

This Example illustrates the preparation of a preferred embodiment of the present invention, a base neutralized aqueous dispersion of a hydroxyl functional acrylic polymer prepared from 60 percent by weight of 2-hydroxyethyl acrylate and 40 percent by weight of n-butyl methacrylate in isopropanol rather than xylene using VAZ0-67 as initiator instead of tertiary-butyl perbenzoate.

With the exception of the above changes, this Example was similar to Example C, above. The resultant hydroxyl functional acrylic polymer had an acid value of about 1.7.

Upon distillation to remove isopropanol, the dispersion was stable.

EXAMPLE H

This Example illustrates the preparation of a base neutralized aqueous dispersion of a hydroxyl functional acrylic polymer in AROMATIC 100 solvent from 50 percent by weight of 2-hydroxyethyl acrylate and 50 percent n-butyl methacrylate using tertiary-butyl perbenzoate initiator and 5 percent N,N-dimethylethanolamine for neutralization.

| Ingredients | Parts by Weight |
| --- | --- |
| Charge 1 | |
| AROMATIC 100[1] | 105.0 |
| Charge 2 | |
| 2-Hydroxyethyl acrylate | 200.0 |
| n-Butyl methacrylate | 200.0 |
| Tertiary-butyl perbenzoate | 20.0 |
| Charge 3 | |
| N,N-dimethylethanolamine | 20.0 |
| Charge 4 | |
| Deionized water | 1200.0 |

[1]AROMATIC 100 is a trademark of Exxon for a blend of aromatic petroleum distillates.

This dispersion was prepared in accordance with the procedure detailed in Example A, above. After azeotropic distillation of the AROMATIC 100 solvent, the dispersion phase separated. This dispersion was not stable. It is believed that this was due to the condensation reaction between hydroxyl and acid groups of the polymer at the higher reflux temperature of AROMATIC 100 resulting in a crosslinked matrix sufficient to retard the polymer's dispersibility in water, even though the acid value of the polymer was 6.3. This crosslinking is evidenced by the drop in acid value from 9 (a similar polymer prepared in xylene, see Example 1 of the specification) to 6.3 for the polymer of this example prepared in AROMATIC 100.

EXAMPLE I

This example illustrates the preparation of a base neutralized aqueous dispersion of a hydroxyl functional acrylic polymer in xylene from 50 percent by weight of 2-hydroxyethyl acrylate and 50 percent n-butyl methacrylate using VAZO-67 initiator rather than tertiary-butyl perbenzoate. The percentages based on resin solids, at about 60 percent total solids.

| Ingredients | Parts by Weight |
| --- | --- |
| Initial Charge | |
| Xylene | 1120.0 |
| Feed A | |
| VAZO-67 | 80.0 |
| 2-Hydroxyethyl acrylate | 800.0 |
| n-Butyl methacrylate | 800.0 |

The initial charge was heated in a reaction vessel with agitation to reflux temperature. Feed A was added continuously over a 3 hour period while maintaining the reaction mixture at reflux temperature. At the completion of Feed A, the reaction mixture was held about 3 hours at reflux temperature to complete the polymerization. The reaction mixture was cooled to room temperature. The resultant acrylic polymer had a total solids of 59 percent determined at 110° C. for one hour and an acid value about 2.4 on resin solids.

The acrylic polymer prepared in xylene solution polymerization technique was transferred to aqueous medium as follows:

| Ingredients | Parts by Weight |
| --- | --- |
| Initial Charge | |
| Acrylic resin in xylene | 927.3 |

-continued

| Ingredients | Parts by Weight |
| --- | --- |
| Feed A | |
| Deionized Water | 1669.0 |
| N,N-dimethylethanolamine | 0.3 |

Feed A was added to the initial charge over a 15 minute period with agitation in a reaction vessel suitable for azeotropic distillation under atmospheric pressure. Then the mixture was heated to azeotropic distillation. Upon distillation of the product to remove xylene, the dispersion was not stable. Even with further addition of N,N-dimethylethanolamine to raise the pH to about 9 (which in this case required 3.4 grams) it did not disperse. This illustrates that when the lower end of the range of 2-hydroxyethyl acrylate is used (50 percent in this example) the acid value of the resultant polymer should be at the higher end of the acid value range of from at least about 1.5 to 10. For proportions of 2-hydroxyethyl acrylate which are substantially higher than 50 percent, the acid value of the polymer can be at the lower end of the range.

Variations and modifications as would be apparent to those of skill in the art may be resorted to without departing from the scope of the invention as defined by the claims.

What is claimed is:

1. A waterborne coating composition, comprising:

(a) a base neutralized, stable, aqueous dispersion of a hydroxyl functional acrylic polymer containing less than 1 percent acid and having a number average molecular weight ranging from about 500 to about 4500 and having an acid value of at least about 1.5 and not greater than about 10, synthesized from a vinyl monomer component comprising at least about 50 percent of 2-hydroxyethyl acrylate and at least one other comonomer, the percentages based upon the total weight of the vinyl monomer component, the proportion of each monomer and the acid value being adapted to provide a polymer which forms a stable dispersion in water without externally added surfactant; and (b) a crosslinking agent adapted to react with the hydroxyl groups of the acrylic polymer of (a).

2. The waterborne coating composition of claim 1 wherein the vinyl monomer component consists essentially of said 2-hydroxyethyl acrylate and less than about 50 percent of a non-acid-containing acrylic monomer selected from the group consisting of n-butyl methacrylate, methyl methacrylate, and n-butyl acrylate.

3. The waterborne coating composition of claim 1 wherein the hydroxyl functional polymer of (a) contains about 0.5 percent acid.

4. The waterborne coating composition of claim 1 wherein the hydroxyl functional acrylic polymer has a number average molecular weight of 2500 to 4500.

5. The waterborne coating composition of claim 1 wherein the crosslinking agent is an aminoplast.

6. The waterborne coating composition of claim 1 wherein the crosslinking agent is a polyisocyanate.

7. In a method of preparing a water dispersible polymer comprising the aqueous dispersion polymerization of a dispersed monomer phase in the presence of a continuous phase, wherein the improvement comprises using as dispersant in the continuous phase a base neutralized, stable, aqueous dispersion of a hydroxyl functional acrylic polymer containing less than 1 percent acid and having a number average molecular weight ranging from about 500 to about 4500 and having an acid value of at least about 1.5 and not greater than about 10, synthesized from a vinyl monomer component comprising at least about 50 percent of 2-hydroxyethyl acrylate and at least one other comonomer, the percentages based upon the total weight of the vinyl monomer component, the proportion of each monomer and the acid value being adapted to provide a polymer which forms a stable dispersion in water without externally added surfactant.

* * * * *